(12) United States Patent
Brunet et al.

(10) Patent No.: US 7,773,294 B2
(45) Date of Patent: Aug. 10, 2010

(54) LOW-AVERAGE-POWER PARABOLIC PULSE AMPLIFICATION

(75) Inventors: François Brunet, Madison, WI (US); Louis Desbiens, St.-Augustin-de-Desmaures (CA)

(73) Assignee: Institut National D'Optique, Quebec (Quebec) (CA)

( * ) Notice: Subject to any disclaimer, the term of this patent is extended or adjusted under 35 U.S.C. 154(b) by 145 days.

(21) Appl. No.: 11/891,780

(22) Filed: Aug. 13, 2007

(65) Prior Publication Data

US 2009/0046352 A1 Feb. 19, 2009

(51) Int. Cl.
*H04B 10/17* (2006.01)
(52) U.S. Cl. ..................... 359/341.3; 372/25
(58) Field of Classification Search ............. 359/341.3, 359/341.5; 372/25
See application file for complete search history.

(56) References Cited

U.S. PATENT DOCUMENTS

| | | | |
|---|---|---|---|
| 5,923,684 | A | 7/1999 | DiGiovanni et al. |
| 6,288,834 | B1 * | 9/2001 | Sugaya et al. ............ 359/341.1 |
| 6,411,431 | B2 | 6/2002 | Sugaya et al. |
| 6,507,430 | B2 | 1/2003 | Yenjay |
| 6,917,631 | B2 | 7/2005 | Richardson et al. |
| 6,972,897 | B2 | 12/2005 | Song et al. |
| 6,990,270 | B2 | 1/2006 | Nicholson |
| 7,167,300 | B2 | 1/2007 | Fermann et al. |
| 7,233,607 | B2 | 6/2007 | Richardson et al. |
| 2003/0137722 | A1 * | 7/2003 | Nikolajsen et al. ....... 359/341.1 |
| 2003/0156605 | A1 * | 8/2003 | Richardson et al. ........... 372/25 |
| 2004/0213511 | A1 * | 10/2004 | Scholz ........................ 385/27 |
| 2004/0240037 | A1 | 12/2004 | Harter ........................ 359/333 |
| 2005/0105865 | A1 | 5/2005 | Fermann et al. ............. 385/122 |
| 2005/0190802 | A1 | 9/2005 | Richardson et al. ........... 372/25 |
| 2006/0029111 | A1 * | 2/2006 | Liu ............................. 372/6 |
| 2006/0120418 | A1 | 6/2006 | Harter et al. .................. 372/30 |

OTHER PUBLICATIONS

D. Anderson et al., "Wave-breaking-free-pulses in nonlinear-optical fibers", *J. Opt. Soc. Am. B*, vol. 10, No. 7, Jul. 1993, pp. 1185-1190.
G. Chang et al., "Dependence of parabolic pulse amplification on stimulated Raman scattering and gain bandwidth" *Optics Letters*, vol. 29, No. 22, Nov. 15, 2004, pp. 2647-2649.
B. Deutsch et al., "Chromatic dispersion of erbium-doped silica fibres", *Electronics Letters*, vol. 28, No. 3, Jan. 30, 1992, pp. 303-305.
M.E. Fermann et al., "Generation and propagation of high-power parabolic pulses in optical fibers", *CLEO*, CME2, (2000), pp. 21-22.
M.E. Fermann et al., "Self-Similar Propagation and Amplification of Parabolic Pulses in Optical Fibers", *Physical Review Letters*, vol. 84, No. 26, Jun. 26, 2000, pp. 6010-6013.

(Continued)

*Primary Examiner*—Eric Bolda
(74) *Attorney, Agent, or Firm*—Michaelson & Associates; Peter L. Michaelson (57) ABSTRACT

There is provided a parabolic pulse amplifier for amplifying a pulse light signal. The amplifier comprises an ytterbium-doped amplification waveguide pumped using a pump source with a pump central wavelength substantially offset from the absorption transition peak wavelength. The pump wavelength is selected such that the absorption coefficient of pump light and the gain coefficient of the signal are substantially equal in the amplification waveguide such that the amplification gain is distributed substantially uniformly along the amplification waveguide.

10 Claims, 8 Drawing Sheets

OTHER PUBLICATIONS

A. Galvanauskas et al., "13-W average power ultrafast fiber laser", *CLEO*, CPD 3-1 /5, (2000), 2 pp.

V.I. Kruglov et al., "Self-similar propagation of parabolic pulses in normal-dispersion fiber amplifiers", *J. Opt. Soc. Am. B*, vol. 19, No. 3, Mar. 2002, pp. 461-469.

R. Paschotta et al., "Ytterbium-Doped Fiber Amplifiers", *IEEE Journal of Quantum Electronics*, vol. 33, No. 7, Jul. 1997, pp. 1049-1056.

T. Schreiber et al., "Microjoule-level all-polarization-maintaining femtosecond fiber source", *Optics Letters*, vol. 31, No. 5, Mar. 1, 2006, pp. 574-576.

* cited by examiner

LOW-AVERAGE-POWER PARABOLIC PULSE AMPLIFICATION

TECHNICAL FIELD

The present invention relates to optical amplifiers. More particularly, the present invention relates to parabolic pulse amplification.

BACKGROUND ART

Optical fibre amplifiers are used to amplify either continuous or pulsed optical signals. There are two main techniques for amplifying ultrashort light pulses, such as femtosecond pulses, using optical fibre amplifiers.

The first technique, called fibre chirped-pulse amplification, uses a combination of three subcomponents, namely a stretcher, an optical fibre amplifier and a compressor. The stretcher is a dispersive optical element which introduces a spectral chirp in the short pulses to be amplified so that the frequency content of each pulse is spread over time. As a result, the pulse duration is increased, and the peak power of the pulse is reduced.

The chirped pulses are then injected in a standard optical fibre amplifier. Pulse amplification takes place with low non-linear effects, as the peak power is reduced. After amplification, a dispersive compressor is used to bring the frequency components of the amplified pulses back in phase, causing the pulse to retrieve its original (short) duration.

A second and more recent technique is called parabolic pulse amplification (see Fermann, "Self-Similar Propagation and Amplification of Parabolic Pulses in Optical Fibers", Physical Review Letters 84 #26, p6010 (26 Jun. 2000)). The origin of this technique is the observation of an asymptotic solution to the NonLinear Schrödinger Equation (NLSE) for short pulses guided in an optical fibre showing gain and normal dispersion. The shape of the pulse corresponding to this asymptotic solution is a parabola, hence the name parabolic pulse amplification. A pulse being amplified in the parabolic regime gets an increasingly broader spectrum and a linear chirp together with a higher energy as it propagates in the optical waveguide.

Parabolic pulse amplification is typically used in amplification of femtosecond pulses produced by a femtosecond laser oscillator, such as a mode-locked fibre laser. A femtosecond fibre laser oscillator usually has a pulse repetition frequency between 5 and 100 MHz. On the other hand, for some applications such as material processing, a pulse repetition frequency of about 100 kHz is desirable. In parabolic pulse amplification, an adequate balance of dispersion, non-linearity and gain has to be present throughout the length of the amplifier for the parabolic asymptotic solution to be reached. Reducing the pulse repetition frequency of the input signal, and consequently reducing the average power of the input signal, results in a small signal gain regime in the front end of the amplifier. This results in an unbalanced gain and to improper conditions for parabolic pulse amplification.

SUMMARY OF INVENTION

Therefore, in accordance with an aspect of the present invention, there is provided a parabolic pulse amplifier for amplifying a low-average-power pulse light signal. An example application of the provided amplifier is the amplification of a low-repetition-frequency ultrashort-pulse light signal such as a low-repetition-frequency femtosecond pulse signal. High-repetition-frequency short-pulse signals with low-power pulses are also regarded as low-average-power pulse light signal.

In accordance with an aspect, there is provided a parabolic pulse amplifier for amplifying a pulse light signal. The amplifier comprises an ytterbium-doped amplification waveguide pumped using a pump source with a pump central wavelength substantially offset from the absorption transition peak wavelength. The pump wavelength is selected such that the absorption coefficient of pump light and the gain coefficient of the signal are substantially equal in the amplification waveguide such that the amplification gain is distributed substantially uniformly along the amplification waveguide.

Another aspect provides a method for amplifying a pulse light signal having a signal wavelength. A rare-earth-doped amplification waveguide is provided and has at least one absorption transition peak wavelength and has a waveguide length. A first pump light is provided and has a first pump central wavelength substantially greater than the at least one absorption transition peak wavelength, lower than the signal wavelength and being selected such that an absorption of the first pump light and an amplification gain of the signal are substantially equal in the amplification waveguide. The first pump light is propagated in the amplification waveguide. Absorption of the first pump light in the amplification waveguide provides the amplification gain such that it is distributed substantially uniformly along the waveguide length. The pulse light signal to be amplified is coupled to the amplification waveguide. The pulse light signal reaches a parabolic pulse asymptotic solution as it propagates along the amplification waveguide to provide an amplified parabolic pulse light signal.

Yet another aspect provides a parabolic pulse amplifier for amplifying a pulse light signal having a signal wavelength. The amplifier comprises a rare-earth-doped amplification waveguide having an absorption transition peak wavelength and a first pump source coupled to the amplification waveguide. The pulse light signal is also coupled to the amplification waveguide for parabolic pulse amplification. The first pump source provides a first pump light with a first pump central wavelength substantially offset from the absorption transition peak wavelength and lower than the signal wavelength. An absorption of the first pump light in the amplification waveguide provides an amplification gain along the amplification waveguide. The first pump central wavelength is selected such that the absorption of the first pump light and the amplification gain of the signal are substantially equal in the amplification waveguide such that the amplification gain is distributed substantially uniformly along the amplification waveguide. The pulse light signal reaches a parabolic pulse asymptotic solution as it propagates along the amplification waveguide to provide an amplified parabolic pulse light signal.

Still another aspect provides a low repetition frequency femtosecond pulse source comprising a femtosecond pulse source for generating a high repetition frequency femtosecond pulse light signal having a signal wavelength; a pulse picker for selecting part of pulses of the high repetition frequency femtosecond pulse light signal to produce a low repetition frequency femtosecond pulse light signal; a parabolic pulse amplifier for amplifying the low repetition frequency femtosecond pulse light signal; and a dispersive compressor for compressing the amplified parabolic pulse light signal to produce an amplified low repetition frequency femtosecond pulse light signal. The amplifier has a rare-earth-doped amplification waveguide having an absorption transition peak wavelength and receiving the low repetition frequency femtosecond pulse light signal; and a first pump source coupled to the amplification waveguide for providing a first pump light with a first pump central wavelength substantially offset from the absorption transition peak wavelength and lower than the signal wavelength. An absorption of the first pump light in the amplification waveguide provides an amplification gain along the amplification waveguide. The first pump central wavelength is selected such that the absorption of the first pump light and the amplification gain of the low repetition frequency femtosecond pulse light signal are substantially equal in the amplification waveguide such that the amplification gain is substantially uniform along the amplification waveguide. The low repetition frequency femtosecond pulse light signal reaches a parabolic pulse asymptotic solution as it propagates along the amplification waveguide to provide an amplified parabolic pulse light signal.

Still another aspect provides a parabolic pulse amplifier for amplifying a pulse light signal having a signal wavelength. The amplifier comprises an in-line pump source for providing a source pump light and an ytterbium-doped amplification waveguide coupled to an output of the pump source waveguide. The in-line pump source comprises a primary pump source for providing a primary pump light having a primary pump central wavelength; an ytterbium-doped pump source waveguide receiving the diode pump light and the pulse light signal, and having an absorption transition peak wavelength of about 976 nanometers and an emission transition peak wavelength of about 1030 nanometers. The primary pump central wavelength corresponds to the absorption transition peak wavelength and an absorption of the primary pump light in the pump source waveguide generates amplified spontaneous emission at least at the emission transition peak wavelength to produce a source pump light. The pulse light signal propagating in the pump source waveguide is to exit at an output of the pump source waveguide. The ytterbium-doped amplification waveguide is coupled to an output of the pump source waveguide such that the source pump light produced in the pump source waveguide and the pulse light signal exiting the pump source waveguide are both coupled to the amplification waveguide for parabolic pulse amplification. An absorption of the source pump light in the amplification waveguide provides an amplification gain along the amplification waveguide. The pulse light signal reaches a parabolic pulse asymptotic solution as it propagates along the amplification waveguide to provide an amplified parabolic pulse light signal.

BRIEF DESCRIPTION OF THE DRAWINGS

FIG. 4 comprises FIG. 4A, FIG. 4B and FIG. 4C which are graphs showing the amplification dynamic of an ytterbium-doped optical amplifier, wherein FIG. 4A shows the 976-nm pumped amplification of a high Pulse Repetition Frequency (PRF) signal, FIG. 4B shows the 976-nm pumped amplification of a low PRF signal and FIG. 4C shows the 1032-nm pumped amplification of a low PRF signal;

It will be noted that throughout the appended drawings, like features are identified by like reference numerals.

DETAILED DESCRIPTION

Figure 1:
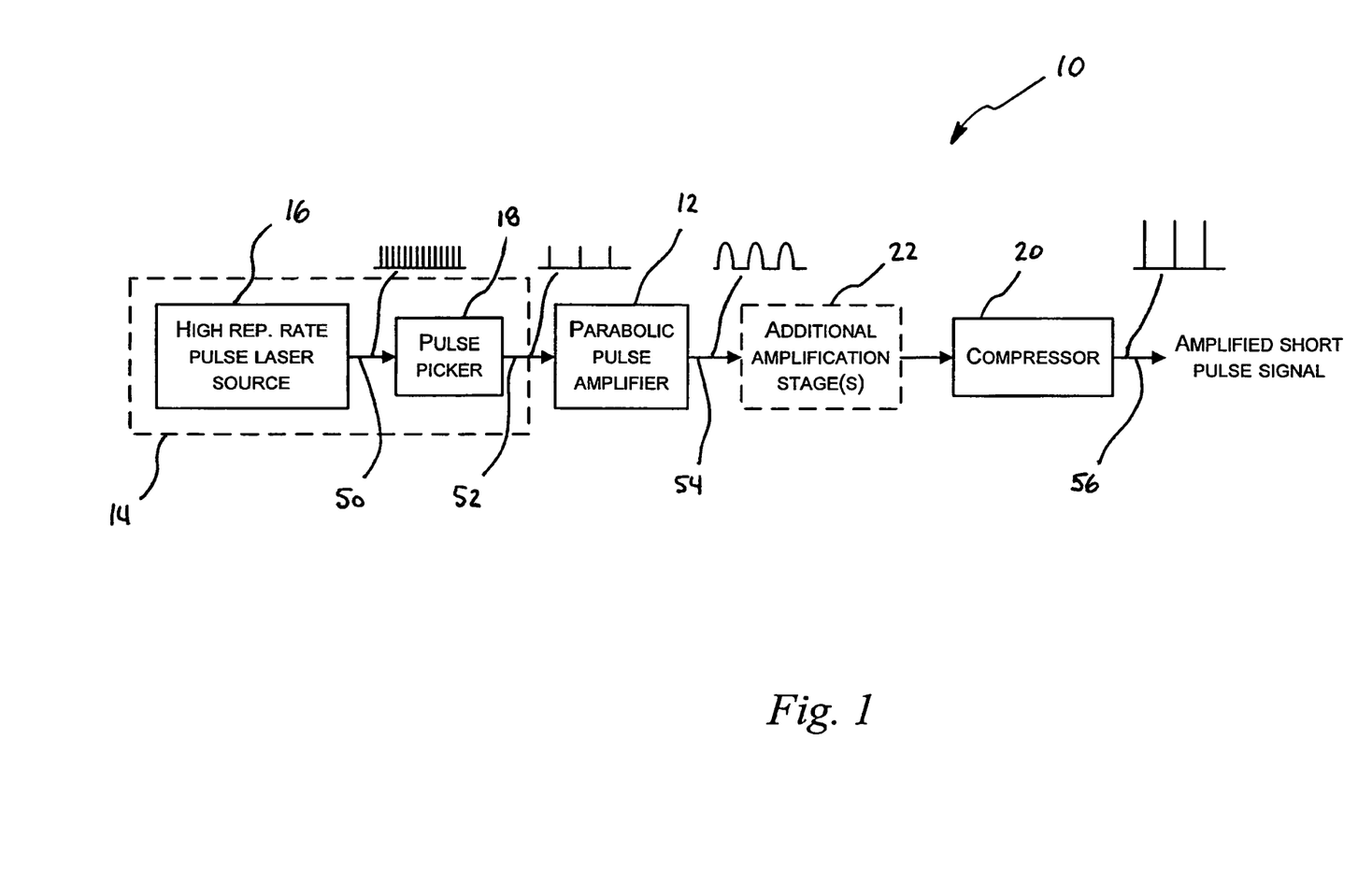
FIG. 1 is a block diagram illustrating a low repetition frequency short-pulse source incorporating a parabolic pulse amplifier.

Referring now to the drawings, FIG. 1 shows a low-repetition-frequency short-pulse light source system 10 incorporating a parabolic pulse amplifier 12. The system 10 is used to produce a low-Pulse-Repetition-Frequency (PRF) femtosecond pulse light signal having a wavelength of 1064 nm, from a high-PRF pulse laser source 16. The system 10 comprises a low-PRF pulse light source 14 which is amplified using a parabolic pulse amplifier 12. In this example, the low-PRF pulse light source 14 is provided by cascading a high-PRF pulse light source 16 and a pulse picker 18 for selecting a fraction of the pulses produced by the high-PRF pulse light source 16 in order to reduce the PRF.

In this case, the high-PRF pulse laser source 16 is a commercially available mode-locked fibre laser manufactured by Calmar Optcom™. Femtosecond fibre laser oscillators usually produce a high-PRF pulse signal 50 having a PRF of the order of 5 to 100 MHz. For many applications, a PRF below 5 MHz, and typically in the order of 100 kHz, is more desirable. In this case, the high-PRF pulse laser source 16 produces a high-PRF pulse signal 50 having a PRF of 23.5125 MHz with an output power of 29 mW and pulse duration of 1.08 ps.

One possible solution for producing a low-PRF signal is to first amplify a high-PRF signal and then reduce the PRF using a pulse picker placed at the output of the amplifier. This scheme is not ideal for various reasons including the fact that it is not quite efficient to use the amplification gain to amplify pulses that are then discarded.

In the system 10, the pulse picker 18 is placed before the parabolic pulse amplifier 12 to receive the high-PRF pulse signal 50 and select some of the pulses to generate a low-PRF pulse signal 52. A pulse picker 18 is usually made of an acousto-optic modulator or an electro-optic modulator. In this case, the pulse picker 18 is a Photline Technologies™ NIR-MX-LN03-00-P-P electro-optic modulator having an extinction ratio of 30 dB and insertion losses of 5 dB. Placing the pulse picker 18 before the parabolic pulse amplifier 12 is more efficient as pulses are selected before extracting energy from the parabolic pulse amplifier 12. Moreover, the optical damage threshold requirements of the pulse picker 18 are relaxed when the blocked pulses are low-energy pulses.

The parabolic pulse amplifier 12 receives the low-PRF pulse signal 52 for amplification. The low-PRF pulse signal 52 reaches a parabolic pulse asymptotic solution as it propagates along the parabolic pulse amplifier 12 to provide an amplified parabolic pulse signal 54. According to the asymptotic solution of the nonlinear Schrodinger equation, the high-energy pulses of the resultant amplified parabolic pulse signal 54 has a broad spectrum and linear chirp, the pulses are thus stretched over time. The linear chirp therefore needs to be compensated for using a dispersive compressor 20 having an opposite chirp. The parabolic pulses are thus recompressed, which result is an amplified short pulse signal 56. The dispersive compressor 20 consists, for instance, of a portion of anormal dispersion compensating optical fibre, a pair of diffraction gratings or dispersive prisms or a combination of the last two, namely a pair of grisms. In this case, the dispersive compressor 20 consists of a pair of 715.703.060 PC 0900 30×30×6 holographic diffraction gratings from Spectrogon™, having 900 lines per millimetres optimized at 1064 nm. The pair of gratings is arranged for double propagation in the compressor using a hollow roof mirror. The deviation angle on the gratings is of 12 degrees.

Figure 2:
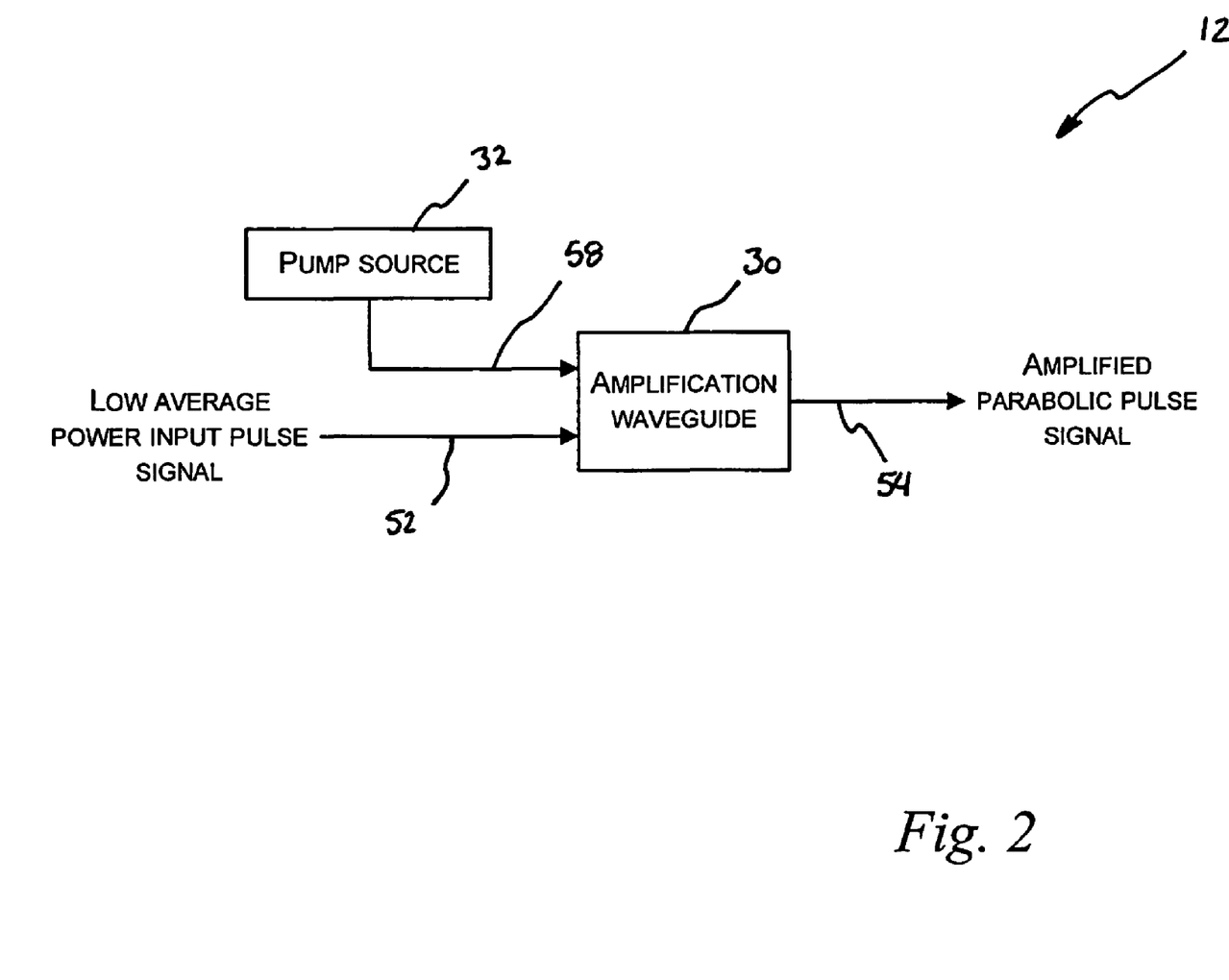
FIG. 2 is a block diagram showing the main components of a parabolic pulse amplifier such as the one used in the short-pulse source of FIG. 1.

FIG. 2 shows the main components of a parabolic pulse amplifier 12 such as the one used in the system 10 of FIG. 1. The parabolic pulse amplifier 12 comprises an ytterbium-doped amplification waveguide 30 to which the low-PRF pulse signal 52 to be amplified, or a low-average-power input pulse signal, is coupled for parabolic pulse amplification. In the illustrated example case, the low-PRF pulse signal 52 to be amplified has a wavelength of about 1064 nm but it is noted that the signal wavelength can be varied. The amplification waveguide 30 is pumped using a pump source 32 having a central wavelength selected to be of about 1032 nm as will be explained hereinbelow, for providing the proper parabolic pulse asymptotic conditions in the case of a low-average-power input pulse signal. An absorption of the pump light 58 in the amplification waveguide 30 provides an amplification gain which is distributed along the amplification waveguide 30. The result is an amplified parabolic pulse signal 54 that can be recompressed using a dispersive compressor 20 as shown in FIG. 1 to provide an amplified short-pulse signal.

As a consequence of their duration, short pulses are usually characterized by a high peak power. When such pulses are guided in an optical waveguide, this high peak power spurs nonlinear optical effects, such as self-phase modulation. Propagation of a pulse signal 52 through an amplification waveguide 30 is governed by the nonlinear Schrödinger equation, which takes into account self-phase modulation, group-velocity dispersion, background loss, and amplification gain. As a rule of thumb, nonlinear effects become significant once the pulse has been guided over a fibre length corresponding to the nonlinear length, $L_{NL}$, given by:

$$L_{NL} = \frac{A_{eff}\lambda}{2\pi n_2 P_0}, \qquad (1)$$

wherein $A_{eff}$ is the effective area of the waveguide core, $\lambda$ is the wavelength, $n_2$ is the nonlinear index, and $P_0$ is the pulse peak power. Since the nonlinear index $n_2$ is a constant for the optical waveguide material, nonlinear effects are significant after propagation over a short waveguide strand when the core effective area $A_{eff}$ is small, and when the peak power $P_0$ is large.

Parabolic pulses correspond to an asymptotic solution to the nonlinear Schrödinger equation, which describes the propagation of light in optical waveguide amplifiers, for short pulses propagating in an optical waveguide showing gain and normal dispersion. According to the nonlinear Schrödinger equation, a combination of normal dispersion, self-phase modulation and distributed gain in an amplification waveguide (i.e. a rare-earth doped waveguide) results into a self-similar asymptotic solution wherein the pulse acquires a parabolic shape in time and a linear chirp. In these conditions, the parabolic pulse propagates in the amplification waveguide, and gets amplified and acquires a linear chirp, while maintaining its parabolic shape. The parabolic pulse is the asymptotic solution of the nonlinear Schrödinger equation for long propagation lengths. The pulse characteristics are determined by the energy of the incoming pulse signal 52 and the parameters of the parabolic pulse amplifier 12, and are independent of the shape of the incoming pulse signal 52. This means that any pulse propagated over a sufficient length of amplification waveguide under the above-mentioned conditions will reach the parabolic pulse asymptotic solution, independently of the input shape of the pulses.

The parabolic asymptotic solution is characterized by the following first equation which links the energy of the parabolic pulse E and its overall half duration $T_p$ with the amplification waveguide constants:

$$\frac{E}{T_p^3} = \frac{2g^2}{27\gamma\beta_2} \qquad (2)$$

and by the following second equation describing the temporal frequency spread of the pulse by linking the instantaneous angular frequency $w_{inst}(t)$ of the pulse to amplification waveguide characteristics:

$$\omega_{inst}(t) = \omega_0 + \frac{g}{3\beta_2}t, \qquad (3)$$

wherein g is the linear gain coefficient in $m^{-1}$, $\gamma$ is the nonlinear coefficient which is inversely proportional to the effective area of the mode, and $\beta_2$ is the dispersion coefficient of the optical waveguide. Equation (2) defines the specific asymptotic solution corresponding to given amplification conditions.

Since this amplification principle leans on an asymptotic solution, short pulses need to travel over a certain fibre length before being qualified as parabolic. An adequate balance of dispersion, self-phase modulation and amplification gain has to be present throughout the length of the amplification waveguide 30. Consequently, one has to optimize the gain per unit length together with the total gain of the amplifier. Studies show that performances of a parabolic pulse amplifier having a gain per unit length too low will be limited by stimulated Raman scattering. On the other hand, parabolic pulse amplification in an amplification waveguide 30 having a gain per unit length too high will be limited by the gain bandwidth.

Figure 3:
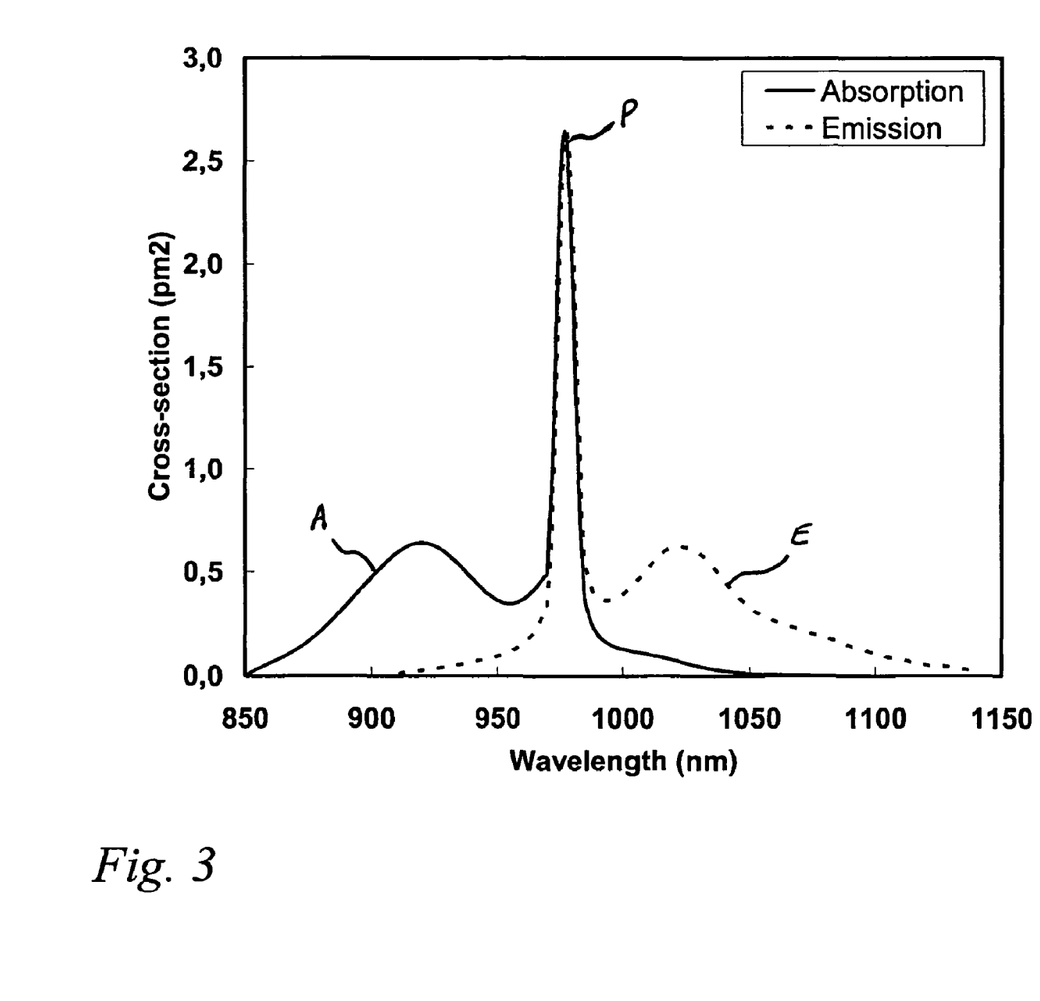
FIG. 3 is a graph showing the absorption and emission transition cross-section spectra of the ytterbium ion in a silica glass optical waveguide.

The present parabolic pulse amplifier 12 is illustrated herein using a silica ytterbium-doped optical waveguide, which ion transition cross-sections are shown in FIG. 3. Ytterbium-doped optical waveguide amplifiers are generally pumped using a pump source having a central wavelength around 976 nm which corresponds to the emission (E curve) and to the absorption (A curve) transition cross-section peak P. The emission cross-section at 1064 nm is about 0.25 $pm^2$, whereas the peak absorption cross-section at 976 nm is about 2.65 $pm^2$.

The amplification gain coefficient in an optical amplifier is defined as follows:

$$g = \Gamma_s(N_2\sigma_{e,s} - N_1\sigma_{a,s}), \qquad (4)$$

wherein $N_1$ and $N_2$ are respectively the ground state population density and the metastable state population density in the amplification waveguide, $\sigma_{a,s}$ and $\sigma_{e,s}$ are respectively the absorption and the emission cross-sections at the signal wavelength, and $\Gamma_s$ is the confinement factor between the signal field and the rare-earth population. The pump absorption coefficient in an optical amplifier is defined as follows:

$$\alpha = \Gamma_p(N_2\sigma_{e,p} - N_1\sigma_{a,p}), \quad (5)$$

wherein $\sigma_{a,p}$ and $\sigma_{e,p}$ are respectively the absorption and the emission cross-sections at the pump wavelength, and $\Gamma_p$ is the confinement factor between the pump field and the rare-earth population.

As in the embodiment of FIG. 2, pumping around 1032 nm provides a pump absorption coefficient α which is similar to the gain coefficient g at the signal wavelength 1064-nm. It is consequently possible to design an amplifier having a gain which is substantially uniform over its length, while absorbing most of the available pump power. Suitable conditions for parabolic pulse amplification can then consequently be reached.

It is noted that the pump wavelength can be varied within certain conditions. First, the pump wavelength should be sufficiently offset from the cross-section peak P such that the pump absorption cross-section $\sigma_{a,p}$ is substantially reduced compared to the peak absorption cross-section $\sigma_{a,976}$ at peak P corresponding to the absorption transition wavelength (976 nm). The pump wavelength should of course be lower than the signal wavelength to impart gain at the signal wavelength. In order to avoid high generation of ASE at the cross-section peak P, the pump wavelength is also selected above the cross-section peak P at 976 nm. A pump wavelength between about 1015 and 1045 nm is typically suitable to provide a pump absorption coefficient α which is similar to the signal gain coefficient g. An appropriate pump wavelength may be selected as a function of the signal wavelength and average power.

Figure 4:
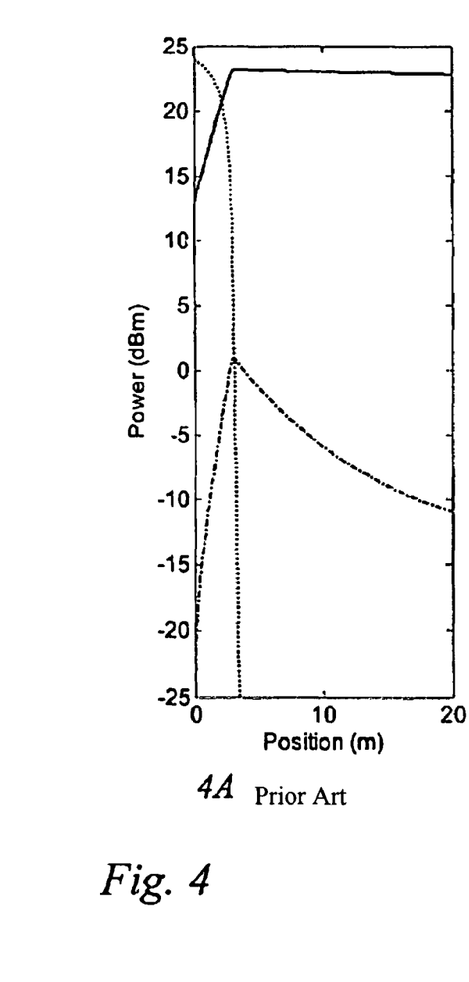

FIG. 4 compares the amplification dynamic of three ytterbium-doped optical amplifiers through numerical simulations. FIG. 4A shows the 976-nm pumped amplification of a high-PRF signal of 20 MHz. The average signal input power is 20 mW in this case. It can be appreciated that the gain coefficient of the signal is substantially uniform over the first 6.5 meters of the optical waveguide. These amplification conditions should then be proper for parabolic pulse amplification by reducing the optical waveguide length to 6.5 meters.

FIG. 4B shows the amplification dynamic obtained with the same ytterbium-doped optical waveguide but when a pulse picker is used to reduce the PRF of the signal to 300 kHz. The pump wavelength is still 976 nm. The average signal input power is 95 µW in this case. FIG. 4B shows that in these small signal conditions the gain coefficient of the signal is substantially uniform over the first 11.5 meters of the optical waveguide. However, it is also shown that, due to the small signal conditions, the Amplified Spontaneous Emission (ASE) generated over this length is substantially more important. The high ASE level at the output of the amplifier is an important drawback. Whereas adequate amplification at 1064 nm can nonetheless be carried out, ASE at 1032 nm would use a significant part of the pump power, therefore curtailing the potential gain at the signal wavelength and spoiling the signal-to-ASE ratio of the amplifier. It is noted that in the case of small signal amplification in a non parabolic pulse amplifier, the optical waveguide could be made longer (more than 20 m in the present conditions) so that the ASE generated around 1030 nm is reabsorbed in favour of the signal to be amplified. This is however not applicable to a parabolic pulse amplifier as the signal gain should be substantially uniform along a parabolic pulse amplifier.

FIG. 4C shows the amplification dynamic obtained with a similar ytterbium-doped optical waveguide using a pulse picker to reduce the PRF of the signal to 300 kHz but when the pump wavelength is 1032 nm rather than 976 nm. The average signal input power is also 95 µW. Even in these small signal conditions, it can be seen that the gain coefficient of the signal is substantially uniform over the first 12.5 meters of the optical waveguide. This results from the lower absorption cross-section at 1032 nm which stretches the pump power absorption, and consequently the signal gain, over a longer portion of optical waveguide. Less ASE is also generated as the pump wavelength is above the second emission cross-section peak located which is located at about 1030 nm. It is noted that the optical waveguide used in this case was more strongly doped in ytterbium than in the two other simulations, in order to increase absorption at 1030 nm. The ytterbium-doped optical fibre used in this simulation has a maximum absorption of 530 dB/m at 976 nm.

Figure 5:
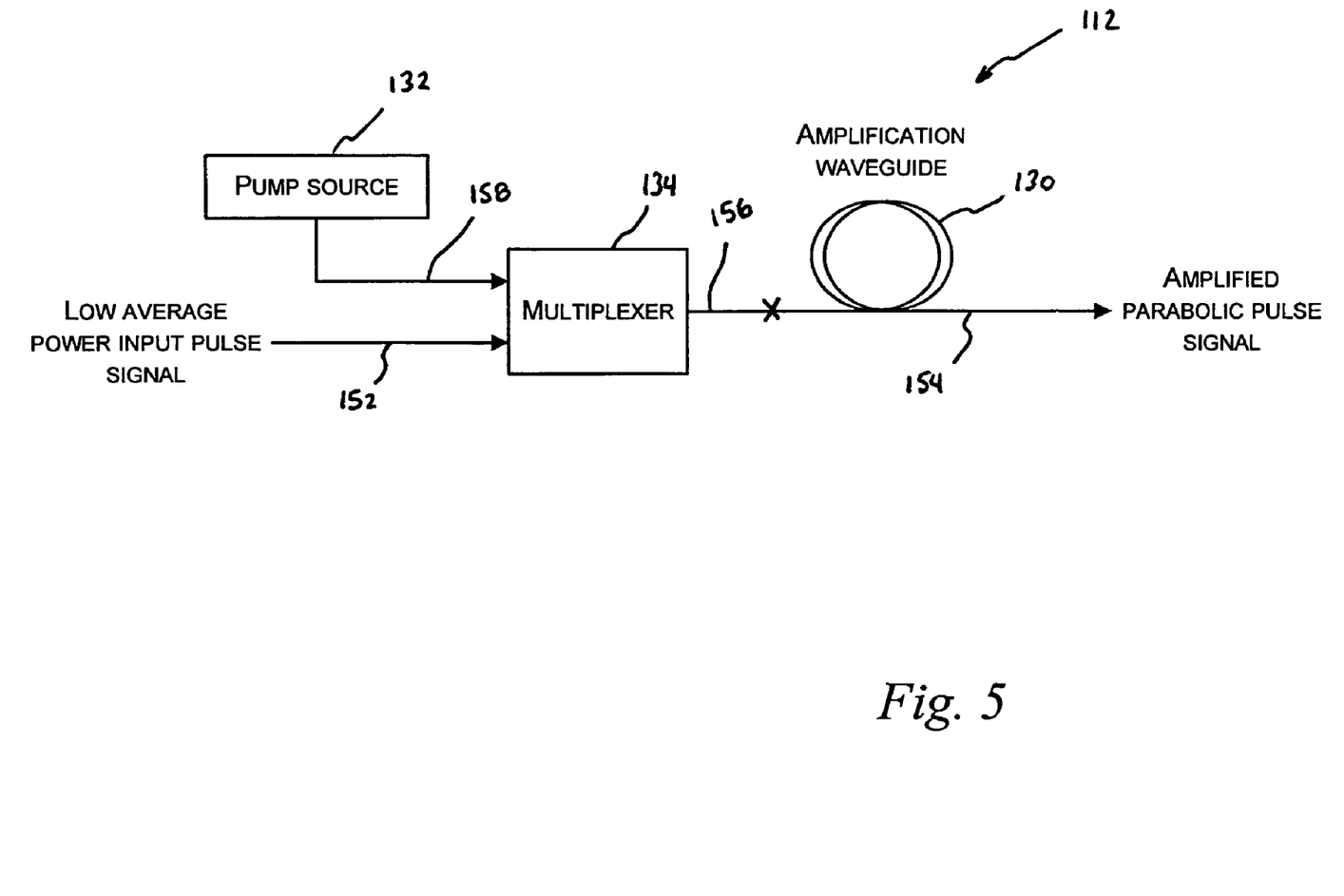
FIG. 5 is a block diagram illustrating a parabolic pulse amplifier wherein a pump source is independently provided.

FIG. 5 shows an example parabolic pulse amplifier 112 for amplifying a low-average-power pulse signal 152 with a signal wavelength of about 1064 nm, and which can be used in the system 10 of FIG. 1. An ytterbium-doped amplification optical fibre 130 consists of a 65-m-long ytterbium-doped optical fibre and is pumped in copropagation with the low-average-power pulse signal 152 to be amplified using an independent pump source 132 at about 1032 nm. The pump source 132 and the low-average-power pulse signal 152 are coupled to the amplification optical fibre 130 using a multiplexer 134, for providing an amplified parabolic pulse signal 154 at the output of the amplification fibre 130.

The multiplexer 134 is a dichroic coupler receiving the signal 152 at 1064 nm and the pump light 158 at 1032 nm using two separate optical fibre inputs and combining both into a single output optical fibre 156 which is fusion spliced with the input of the amplification optical fibre 130. It is however pointed out that combining two singlemode signals respectively at 1032 nm and 1064 nm is technically challenging. It is possible to use a dichroic coupler or wavelength-division multiplexer such as a thin film filter, a Fibre Bragg Grating (FBG) filter with a circulator, a free space grating or an arrayed waveguide grating. However, since the difference between the wavelengths to be combined is only 32 nm, such a dichroic coupler is likely to show a narrow bandwidth, a high cross-talk, and strong polarization dependency.

The pump source 132 is an ytterbium-doped Fabry-Perot fibre laser pumped at 976 nm and uses FBG filters at 1032 nm to produce a stable 1032-nm pump light. It is however noted than a semiconductor laser may also be used as a pump source 132. It is noted that the amplification fibre 130 could also be pumped in a conterpropagation configuration, as opposed to the copropagation configuration of FIG. 5, by providing the multiplexer 134 at the output of the amplification fibre 130. A wavelength selective filter may also be used if necessary at the output of the amplification fibre 130 to filter out the residual pump light exiting the amplification fibre 130.

Figure 6:
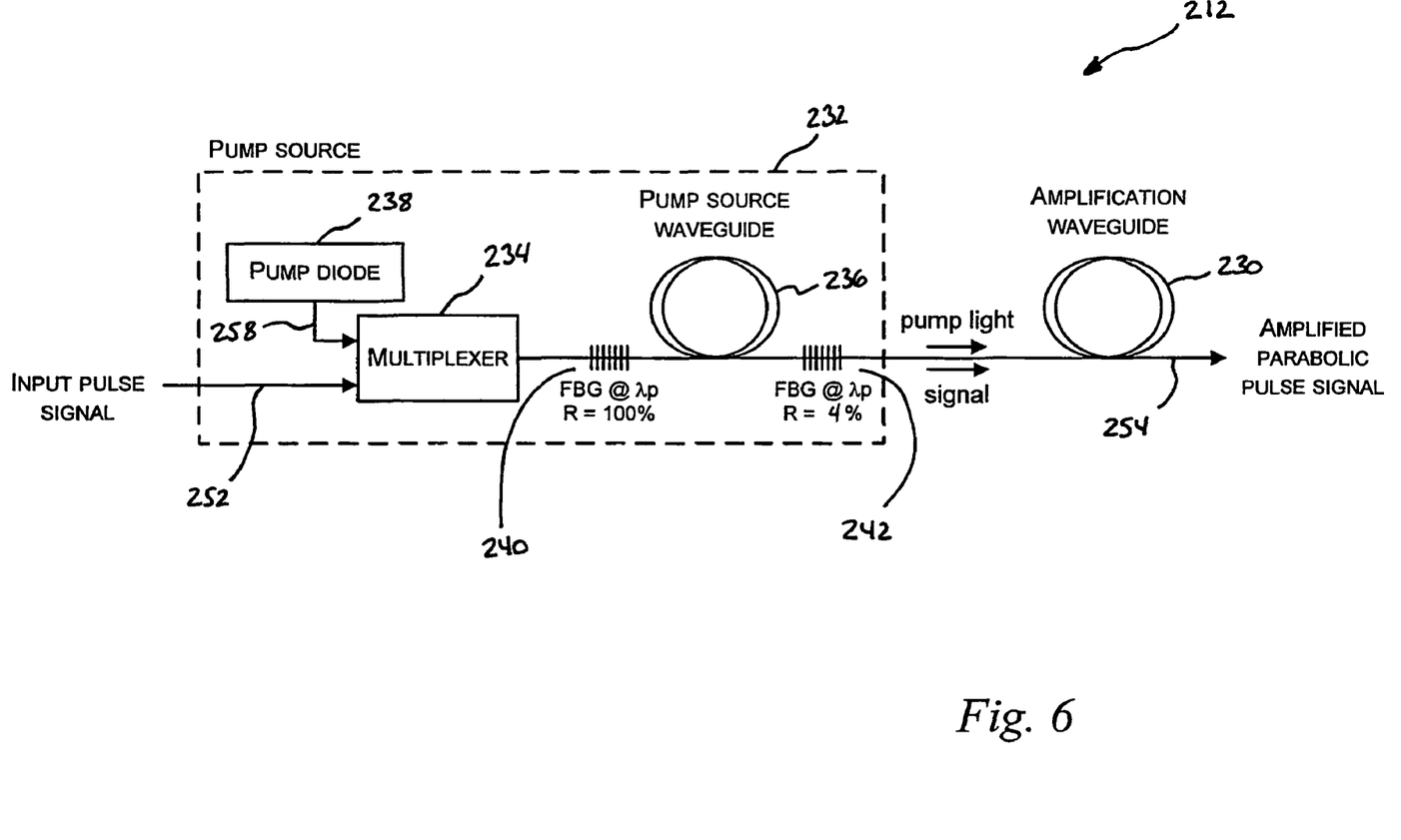
FIG. 6 is a block diagram illustrating another parabolic pulse amplifier wherein a fibre laser is used as an in-line pump source.

FIG. 6 shows another example of a parabolic pulse amplifier 212. The parabolic pulse amplifier 212 comprises two stages, i.e. a 1032-nm pump source 232 arranged in-line with an amplification optical fibre 230. The pump source 232 is used to produce a 1032-nm pump light which is used to pump the second stage for parabolic pulse amplification of the low-average-power input pulse signal 252. The pump source 232 is a Fabry-Perot ytterbium-doped fibre laser consisting of an ytterbium-doped pump source waveguide 236 pumped by a laser pump diode 238 providing pump light 258 with a power of about 400 mW at 974 nm. The optical cavity of the pump source fibre laser is created by placing a reflective filter 240, 242 having a peak reflectivity at 1032 nm at both ends of the pump source waveguide 236, which is, in this illustrative example, a 1.5 m-long ytterbium-doped optical fibre having a maximum absorption of 75 dB/m at 976 nm. The 974-nm pump light 258 and the pulse light signal 252 are combined and coupled to the input of the pump source waveguide 236 using a multiplexer 234. The output of the pump source 232 is coupled to the input of the second stage, i.e. the amplification waveguide 230, such that pulse light signal propagated in the pump source waveguide 236 and exiting at an output of the pump source waveguide 236, and a 1032-nm pump light produced by the 1032-nm pump source 232 are both coupled to the amplification waveguide 230 for parabolic pulse amplification.

The pump source 232, which consists of a Fabry-Perot ytterbium-doped fibre laser, is placed in the optical path of the incoming input low-average-power pulse signal 252. As the pump source waveguide 236 is pumped in copropagation using the pump laser diode 238 at 974 nm, the pumped ytterbium-doped optical fibre produces ASE in the wavelength region between about 1000 and 1150 nm and with a maximum power density around 1030 nm. The ASE produced and propagating in the pump source waveguide 236 is filtered and reflected back in the pump source waveguide 236 at both of its ends, thereby defining the optical cavity and producing a laser emission at 1032 nm. The input reflective filter 240 placed at the input of the pump source waveguide 236 is a highly reflective FBG (nearly 100% reflective) and reflects the conterpropagating laser emission produced in the pump source waveguide 236 at 1032 nm, back into the pump source waveguide 236. The output reflective filter 242 is a 4% reflective FBG 242 that reflects part of the copropagating laser emission at 1032 nm back into the pump source waveguide 236. Laser emission not reflected by the output reflective filter 242 is coupled to the second stage, i.e. the amplification optical fibre 230.

The pump light 258 and the input pulse signal 252 are combined and are both coupled to the pump source waveguide 236 using the multiplexer 234, i.e. a 976-1064 dichroic fibre coupler. The multiplexer 234 may also consist, for instance, of a thin film filter, a Fibre Bragg Grating (FBG) filter with a circulator, a free space grating or an arrayed waveguide grating. Accordingly, both 974-nm pump light 258 and input pulse signal 252 propagate in the pump source waveguide 236. While the pump light 258 is mostly absorbed to produce the 1032-nm pump light, the input pulse signal 252 is only slightly amplified due to the high gain depletion resulting from the 1032-nm lasing. In this illustrative embodiment, the pump source 232 produces a 1032-nm pump light having an optical power of about 200 mW, while the pulse light signal sees a low amplification gain of about 3 dB.

The second stage consists of an amplification waveguide 230, more specifically, a 65-m long ytterbium-doped optical fibre having a maximum absorption of 75 dB/m at 976 nm. Absorption of the 1032-nm pump light provides an amplification gain that is distributed substantially uniformly along the length of the amplification waveguide 230. Consequently, the input pulse signal can be amplified such that it reaches the parabolic pulse asymptotic solution as it propagates along the amplification waveguide to provide an amplified parabolic pulse light signal 254.

Figure 7:
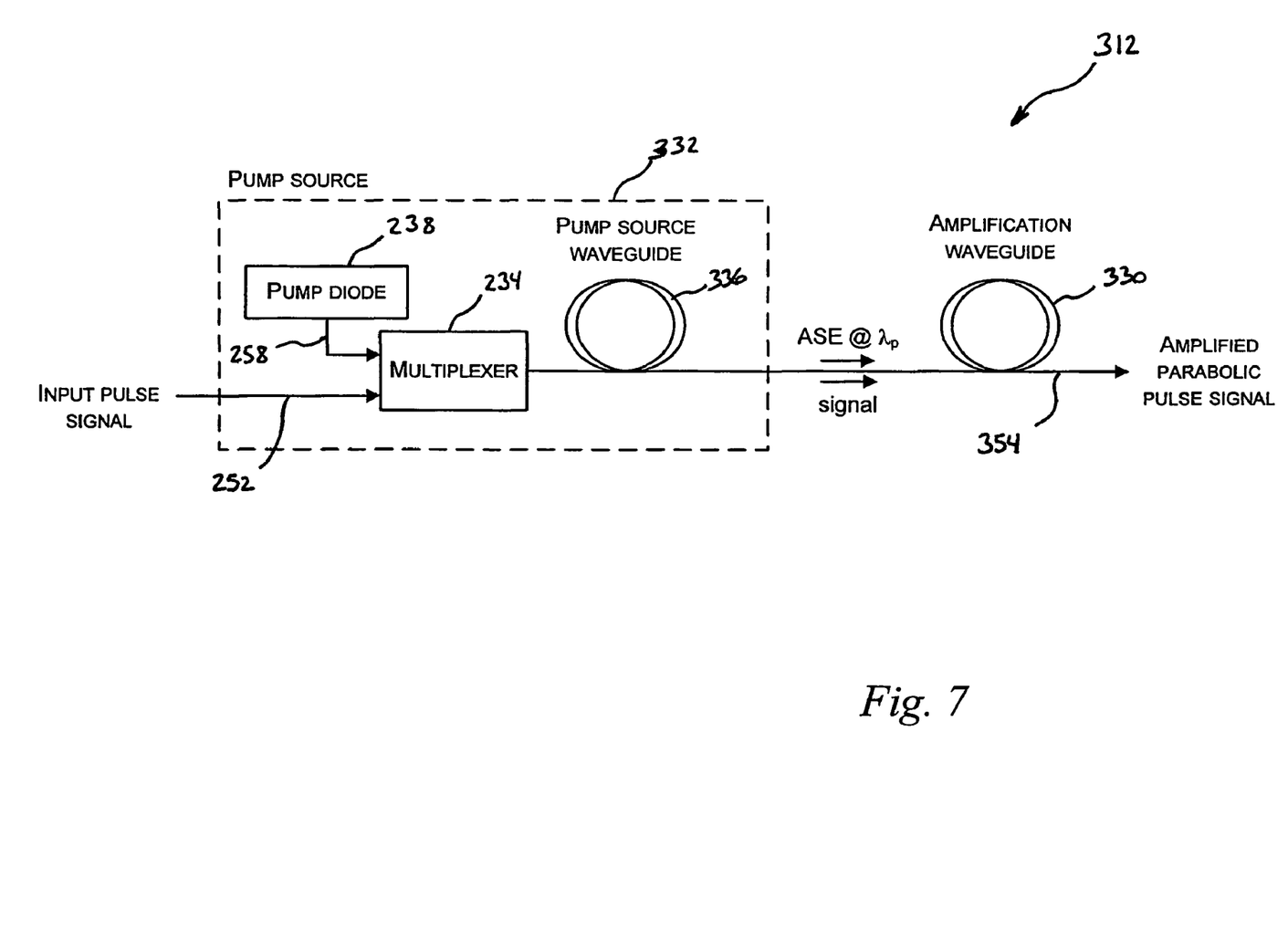
FIG. 7 is a block diagram illustrating still another parabolic pulse amplifier wherein an amplified spontaneous emission source is used as an in-line pump source.

FIG. 7 shows a parabolic pulse amplifier 312 according to another example embodiment. The amplifier 312 of FIG. 7 is similar to the parabolic pulse amplifier 212 of FIG. 6 but the input and output reflective filters 240 and 242 are omitted in the pump source 332. The pump source 332 is an ASE pump source around 1030 nm instead of a Fabry-Perot fibre laser.

As the amplifier 312 and the amplifier 212 are similar in construction and use similar components, the description of like elements and connections will not be repeated. Differences between both will only be described.

The pump source 332 of the amplifier 312 consists of an ytterbium-doped optical fibre pumped by a pump laser diode 238 at 976 nm. The input pulse signal 252 and the pump light are combined using a multiplexer 234 before being injected in the pump source waveguide 336. Absorption of the 976-nm pump light in pump source waveguide 336 produces ASE in the wavelength region between about 1000 and 1150 nm and with a maximum power density around 1030 nm. The copropagating ASE produced is directly coupled to the amplification waveguide 330 for pumping and amplifying the input pulse signal. While the pump light 258 is mostly absorbed to produce the ASE pump light, the input pulse signal 252 experiences only a moderate gain while propagating in the pump source waveguide 336 but ASE generation is significant in due to the small signal regime. Similarly to the parabolic pulse amplifier 212 of FIG. 6, the input pulse signal is amplified such that it reaches the parabolic pulse asymptotic solution as it propagates along the amplification waveguide 330 to provide an amplified parabolic pulse light signal 354. In order to provide a suitable amplification gain coefficient at the signal wavelength when pumping at 1030 nm, the amplification waveguide 330 is more strongly doped than the pump source waveguide 336. For instance, the maximum absorption at 976 nm of the amplification waveguide 330 can be ten times larger than that of the pump source waveguide 336, for the gain coefficient in the amplification waveguide 330 to be substantially equivalent to that of the pump source waveguide 336 at the signal wavelength.

Figure 8:
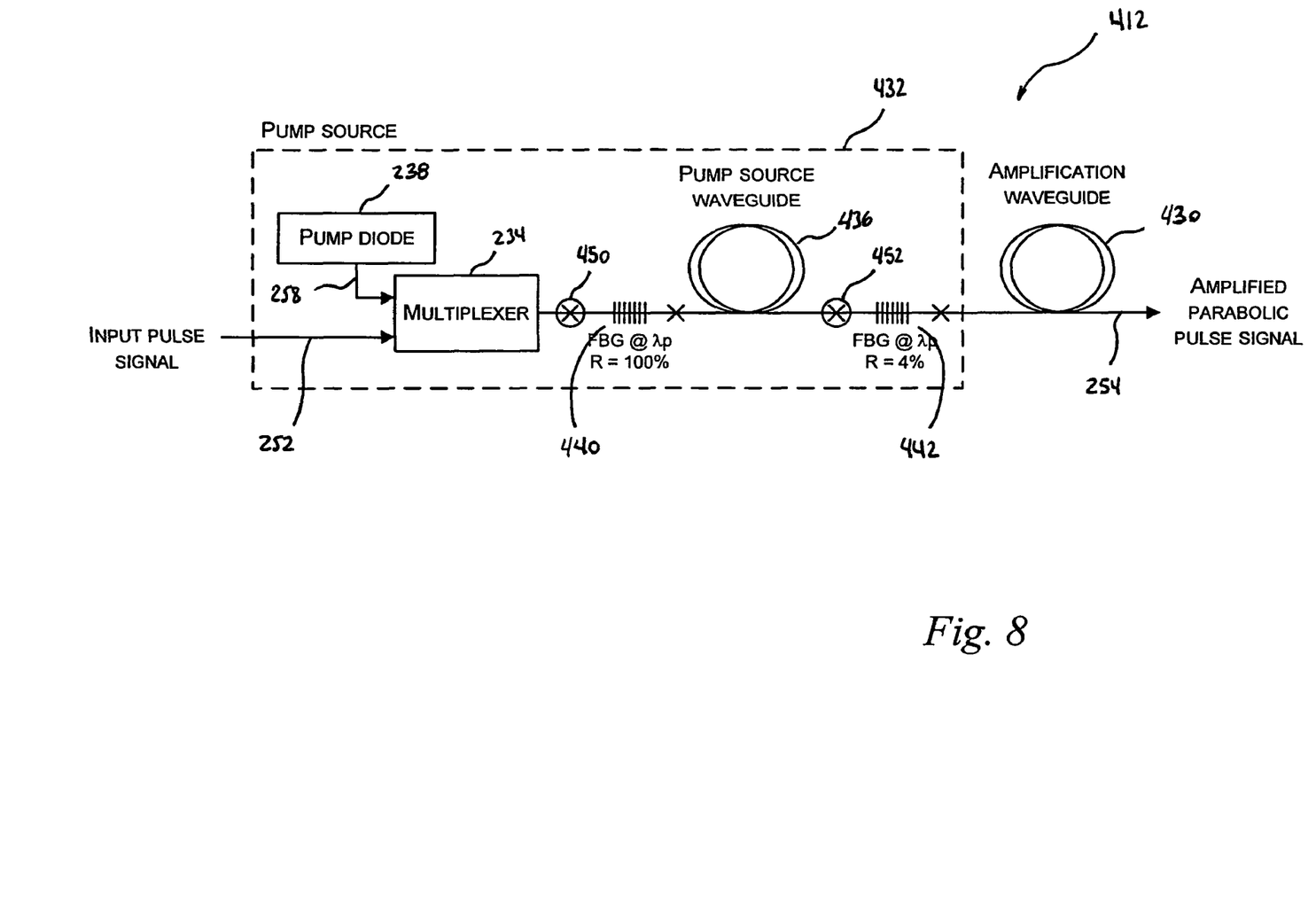
FIG. 8 is a block diagram illustrating another parabolic pulse amplifier wherein a polarisation dependent fibre laser is used as an in-line pump source and used polarization dependent reflective filters.

FIG. 8 shows another example of a parabolic pulse amplifier. The amplifier 412 of FIG. 8 is similar to the parabolic pulse amplifier 212 of FIG. 6 but the pump source 432 is a polarization maintaining pump source 432 in which the generated 1032-nm pump light propagates along one first polarization axis of the pump source waveguide 436 while the pulse light signal at 1064 nm propagates along the other, i.e. the second, polarization axis. This configuration is used to easily separate the amplified signal from the residual pump light at 1032 nm at the output of the parabolic pulse amplifier 412, using a polarisation splitter. As the amplifier 412 and the amplifier 212 are similar in construction and use similar components, the description of like elements and connections will not be repeated. Differences between both will only be described.

The input and output reflective filters 440 and 442 are fibre Bragg gratings written in a polarization maintaining fibre, and the pump source waveguide 436 is a 1.5 m-long polarization maintaining ytterbium-doped optical fibre. Accordingly, each reflective filter 440 or 442 show two different reflection wavelengths, respectively corresponding to the two polarization axes. In this illustrative embodiment, the two reflection wavelengths have a difference of 0.3 nm. The reflective filters 440 and 442 are produced so that the reflection wavelength along the slow propagating axis of one filter corresponds to the reflection wavelength along the fast propagating axis of the other filter. A polarization-crossed fusion splice 452 is introduced in the pump source 432 somewhere between the input and the output reflective filters 440 and 442 so that the slow polarization axis of one reflective filter is aligned with the fast polarization axis of the other reflective filter, such that laser emission at said reflection wavelength and propagating along the proper propagation axis is reflected at both input and output reflective filters 440 and 442. A second polarization-crossed fusion splice 450 is introduced before the input reflective filter 440 so that the input pulse signal 252 propagates along the same polarization axis before and after the pump source 432. The second polarization-crossed fusion splice 450 may also be introduced after the output reflective filter 442 depending on the polarization axis of the reflective filters 440 and 442. Pump light generated at 1032 nm and reflected on the reflective filters 440 and 442 propagates on the polarization axis which is perpendicular to that of the signal along the pump source waveguide 436. All other fusion splices are standard "polarization-aligned" fusion slices. The amplification waveguide 430 is also a polarization-maintaining ytterbium doped optical fibre so that the pulse signal and the 1032-nm pump light also propagate along different polarization axes in the amplification waveguide 430. In this configuration, the pulse signal and the 1032-nm pump light may be more easily split apart, using a polarization splitter or a polarizer for instance, at the output of the amplifier 412 in order to remove residual pump light at 1032 nm.

In this illustrative embodiment, the pump source waveguide 436 is a 1.5-m-long INO Yb-100 optical fibre which has a numerical aperture of 0.15, a mode field diameter at 1060 nm of about 5.6 μm, a cutoff wavelength of 950 nm and a maximum absorption at 976 nm of 75 dB/m. The amplification waveguide is also an INO Yb-100 optical fibre, but is 65-m long.

It is noted that the parabolic amplifiers 12, 112, 212, 312 and 412 are also useful for amplifying other low-average-power pulse sources such as a low-power high-PRF pulses. Accordingly, the low-PRF pulse source 14 of the system 10 of FIG. 1 may be replaced by any low-average-power pulse source.

It is also noted that the amplification waveguides 30, 130, 230, 330 and 430 may use different materials. In the illustrated case, the amplification waveguides 30, 130, 230 and 330 are ytterbium-doped silica optical fibres but it is noted that ytterbium-doped chalcogenide optical fibres may also be used and that the waveguide may include other dopants. The concentration of ytterbium may also vary.

It is also noted that planar rare-earth-doped waveguides may also be used for one or both of the amplification waveguide and the pump source waveguide. Since planar waveguides are typically shorter, ytterbium concentration may be increased to achieve a similar amplification gain.

Increasing/reducing ytterbium concentration in the amplification waveguide may also be used to reduce/increase the length of the amplification waveguide. The same also applies to the pump source waveguide.

Furthermore, it is noted that ytterbium may be replaced by another rare-earth dopant such as erbium for parabolic amplification of a low average power pulsed signal at a different wavelength, such as a wavelength greater than 1600 nm. For example and referring to the configuration of FIG. 5, the pump source 132 provides a pump light having a wavelength around 1550 nm in order to provide a parabolic pulse amplification at a wavelength around 1600 nm in the amplification waveguide 130. Referring to FIG. 8, the pump diode 238 produces pump light at 1480 nm to pump the pump source waveguide 436 of the in-line laser in order to generate a pump source at a wavelength around 1550 nm. The 1550-nm pump source is then used to pump the amplification waveguide 430 for parabolic pulse amplification of the signal around 1600 nm. It is noted that, in order to produce parabolic pulse amplification, the erbium-doped amplification waveguide should have a normal dispersion at the signal wavelength.

The embodiments described above are intended to be exemplary only. The scope of the invention is therefore intended to be limited solely by the appended claims.

The invention claimed is:

1. A method for amplifying a pulse light signal having a signal wavelength, the method comprising:
   providing a rare-earth-doped amplification waveguide having at least one absorption transition peak wavelength and having a waveguide length;
   providing a first pump light having a first pump central wavelength substantially greater than said at least one absorption transition peak wavelength, lower than said signal wavelength and being selected such that an absorption of said first pump light and an amplification gain of said signal are substantially equal in said amplification waveguide;
   propagating said first pump light in said amplification waveguide, said absorption of said first pump light in said amplification waveguide providing said amplification gain such that it is distributed substantially uniformly along said waveguide length; and
   coupling said pulse light signal to be amplified to said amplification waveguide, said pulse light signal reaching a parabolic pulse asymptotic solution as it propagates along said amplification waveguide to provide an amplified parabolic pulse light signal.

2. The method as claimed in claim 1, wherein said providing a first pump light comprises:
   providing a pump source rare-earth doped waveguide having at least one emission transition peak wavelength, said first pump central wavelength corresponding to one of said at least one emission transition peak wavelength;
   providing a second pump light having a second pump central wavelength lower than said at least one emission transition peak wavelength; and
   propagating said second pump light in said pump source waveguide, absorption of said second pump light in said pump source waveguide generating amplified spontaneous emission at least at said at least one emission transition peak wavelength to produce said first pump light.

3. The method as claimed in claim 2, wherein said providing a first pump light further comprises:
   selectively reflecting said amplified spontaneous emission at said at least one emission transition peak wavelength and at both ends of said pump source waveguide to produce said first pump light.

4. A parabolic pulse amplifier for amplifying a pulse light signal having a signal wavelength, the amplifier comprising:
   a rare-earth-doped amplification waveguide having an absorption transition peak wavelength and adapted to receive said pulse light signal for parabolic pulse amplification; and
   a first pump source coupled to said amplification waveguide for propagating therein a first pump light with a first pump central wavelength substantially offset from said absorption transition peak wavelength and lower than said signal wavelength, said amplification waveguide being adapted to provide an amplification gain for said pulse light signal therealong by an absorption of said first pump light in said amplification waveguide, said amplification waveguide being adapted such that said absorption of said first pump light and said amplification gain of said signal are substantially equal in said amplification waveguide such that said amplification gain is distributed substantially uniformly along said amplification waveguide, said amplification waveguide being adapted to provide a parabolic pulse asymptotic solution for said pulse light signal as it propagates along said amplification waveguide to provide an amplified parabolic pulse light signal.

5. The parabolic pulse amplifier as claimed in claim 4, wherein said first pump source comprises:
- a pump source rare-earth-doped waveguide having an emission transition peak wavelength, said first pump central wavelength corresponding to said emission transition peak wavelength; and
- a second pump source coupled to said pump source rare-earth doped waveguide and for providing a second pump light having a second pump central wavelength lower than said emission transition peak wavelength, said pump source waveguide being adapted to provide an absorption of said second pump light in said pump source waveguide to generate amplified spontaneous emission at least at said emission transition peak wavelength and to produce said first pump light.

6. The parabolic pulse amplifier as claimed in claim 4, wherein said amplification waveguide comprises an ytterbium-doped amplification waveguide.

7. The parabolic pulse amplifier as claimed in claim 5, wherein said first pump source comprises a wavelength-selective reflective filter at each end of said pump source waveguide for reflecting said amplified spontaneous emission to provide a laser pump source.

8. The parabolic pulse amplifier as claimed in claim 5, wherein said pump source rare-earth-doped waveguide comprises a pump source ytterbium-doped waveguide.

9. The parabolic pulse amplifier as claimed in claim 7, wherein said pump source waveguide and said amplification waveguide are polarization-maintaining waveguides and the wavelength-selective reflective filters are polarization-dependent reflective filters, a first reflection wavelength of a first one of said filters along a slow polarization axis being substantially equal to a second reflection wavelength of a second one of said filters along a fast polarization axis and corresponding to said first pump central wavelength, said pump source waveguide comprising a polarization-crossed connection between said reflective filters for aligning said slow polarization axis of the first reflective filter with said fast polarization axis of the second reflective filter, said pulse light signal being coupled to said pump source waveguide such that a polarization of said pulse light signal and of said first pump light are perpendicular in said pump source waveguide and in said amplification waveguide.

10. The parabolic pulse amplifier as claimed in claim 7, wherein said reflective filter comprises a fibre Bragg grating.

* * * * *